Patented Apr. 19, 1949

2,467,407

UNITED STATES PATENT OFFICE 2,467,407

CATALYTIC CONVERSION OF FISCHER SYNTHESIS PRODUCT

Robert F. Ruthruff, Chicago, Ill.

No Drawing. Application November 8, 1944, Serial No. 562,567

8 Claims. (Cl. 196—50)

This invention relates to the processing of certain portions of the hydrocarbon product of the Fischer synthesis.

The Fischer synthesis is more or less familiar to those skilled in the art. In this process, a mixture of carbon monoxide and hydrogen is passed over a suitable catalyst at (usually) rather low temperatures and at (usually) atmospheric or low superatmospheric pressures. The carbon monoxide is reduced by the hydrogen present to form a mixture of hydrocarbons ranging from methane to extremely high melting waxes.

In Germany, where this process originated, the carbon monoxide-hydrogen charge is usually prepared from coal or coke. For most purposes, this synthesis gas should contain carbon monoxide and hydrogen in a 1:2 ratio by volume in accordance with the theoretical equation:

$$nCO+2nH_2=(-CH_2-)_n+nH_2O$$

Obviously, such a gas is not formed in the usual water gas reaction:

$$C+H_2O=CO+H_2$$

so a portion of the carbon monoxide is further oxidized with more water (steam) thus forming additional hydrogen:

$$CO+H_2O=H_2+CO_2$$

The overall reaction is:

$$3C+4H_2O=2CO+4H_2+CO_2$$

On removing carbon dioxide from this gas mixture, carbon monoxide and hydrogen are present in the residue in the usually desired proportions.

The desired synthesis gas mixture may also be prepared from natural gas as exemplified by methane. Several procedures are possible, for example:

$$CH_4+1/2O_2=CO+2H_2$$

and $$3CH_4+2H_2O+CO_2=4CO+8H_2$$

In the first reaction it is preferable to use fairly pure oxygen to avoid excessive dilution of the product gas with nitrogen. These reactions may be carried out in an externally heated tube or in regenerative furnaces. A catalyst is preferably used, for example, supported nickel, promoted or not, as desired, with e. g. thoria or ceria. However, catalysts are only necessary when operating at intermediate temperatures; at high temperatures catalysts are not required.

As will be noted from the above, a combination process involving the production of synthesis gas from both coke or coal and natural gas is possible. To obtain synthesis gas of the usually desired 1:2 ratio from coal or coke some carbon must be converted to carbon dioxide. On the other hand, carbon dioxide may be used (together with steam) to convert natural gas to the 1:2 synthesis gas mixture. The combination reaction is:

$$C+CH_4+2H_2O=2CO+4H_2$$

(To convert carbon to the 1:2 synthesis gas mixture carbon dioxide is produced, to convert natural gas to the same mixture carbon dioxide is required. Accordingly, carbon dioxide on the two sides of the above equation cancel. While only one equation is shown this does not necessarily mean that the combination reaction is conducted in one step.)

If a synthesis gas having the components in a ratio of 1:1 is desired, this may be prepared from solid fuels by the usual water gas reaction or by oxidizing natural gas with carbon dioxide:

$$CH_4+CO_2=2CO+2H_2$$

The synthesis gas, no matter how prepared, or in what ratio, must be practically free from organic and inorganic sulfur compounds. The practically complete absence of organic and inorganic sulfur compounds in the synthesis gas charge is necessary to insure a long life for the synthesis catalyst used in the subsequent step. Since the synthesis gas charge is practically free from sulfur, the synthesis products are practically free from this element also. This is, of course, advantageous especially since the response to lead tetraethyl exhibited by low sulfur hydrocarbon stocks is ever so much greater than that exhibited by high sulfur stocks.

The usual Fischer synthesis catalyst is iron or, preferably, cobalt or kieselguhr; magnesia and/or thoria usually being present as promoters. A similarly supported and promoted catalyst containing nickel is also highly active. In fact, at atmospheric pressure, the nickel catalyst is so active that a very considerable part of the charge is converted to methane. At intermediate pressures the nickel catalyst is not satisfactory due to carbonyl formation and consequent catalyst loss. The supported and promoted iron catalyst is not very active at atmospheric pressure but is satisfactory at intermediate pressures. The supported and promoted cobalt catalyst is satisfactory at atmospheric or intermediate pressures.

Less active but more rugged catalysts may be made by reducing fused metal oxides (e. g. of iron). Small amounts of silica, titania, manganese oxide and potassium oxide are usually present as promoters.

The synthesis reaction is usually conducted at atmospheric to say 300 pounds per square inch pressure with supported promoted cobalt catalysts or 75 to 300 pounds per square inch pressure when supported promoted iron catalysts are employed. The reaction temperature is 355 to 390° F. when supported promoted cobalt catalysts are used and about 465° F. when supported promoted iron catalysts are employed. When the less active but more rugged promoted, fused, reduced metal oxide catalysts are used operating pressures are high, for example, 200 to 1500 pounds per square inch or more as are the operating temperatures—500 to 700° F.

When the less active but more rugged promoted, fused, reduced metal oxide catalysts or the supported promoted iron catalysts are employed the composition of the synthesis gas used is considerably altered. With these catalysts the reaction follows the general course:

$$3CO + 3H_2 = 2(-CH_2-) + H_2O + CO_2$$

Hence the synthesis gas should contain the two components in a 1:1 ratio. Methods for the preparation of such a synthesis gas have already been indicated.

As has been mentioned, the reaction products from the Fischer synthesis are hydrocarbons ranging from methane to waxes of extremely high melting point. As would be expected, the composition varies somewhat with the operating conditions. For example, when operating at atmospheric pressure and using a promoted nickel, iron or cobalt on kieselguhr catalyst, the portion of the hydrocarbons produced having more than four carbon atoms to the molecule contains in the neighborhood of 60 to 65% gasoline exhibiting an octane number of 40 to 45. Using the promoted cobalt on kieselguhr catalyst, but operating at say 100 pounds per square inch pressure, the same portion of the hydrocarbons produced contains only about 40 to 45% gasoline of only 25 to 30 octane number. It is evident that on passing from atmospheric pressure operation with a supported promoted cobalt catalyst to intermediate pressure operation the gasoline content of the product declines (i. e. more high boiling hydrocarbons form) and the octane number of the gasoline declines (i. e. the olefine content of the gasoline fraction is less).

Using a supported and promoted iron catalyst at intermediate pressures and 465° F., the portion of the product containing more than four carbon atoms to the molecule is again rich in gasoline and this gasoline is very rich in olefines (i. e. it has a comparatively good octane number). The product contains considerable oxygenated material.

When operating at high pressures in the presence of promoted, fused, reduced metal oxide catalysts the portion of the hydrocarbon product of more than four carbon atoms to the molecule is fairly similar to that formed at intermediate pressures using supported, promoted iron catalysts. For example, the portion of the hydrocarbon product of more than four carbon atoms to the molecule from operations conducted at 660° F. and 1500 pounds per square inch pressure contains about 50% gasoline of 65 to 70 octane number. In addition, the product contains in the neighborhood of 5% oxygenated hydrocarbons.

While a great many additional details of the Fischer synthesis could be given, it is believed that the foregoing is sufficient to provide a general understanding of what this synthesis is, how it is conducted and what it produces.

In the past many factors have been adverse to the introduction of the Fischer process in the United States. Three only will be considered.

In the first place, the United States has been fortunate in the possession of flush petroleum fields. However, it is generally recognized that this condition will not last forever. Of the known underground fuel reserves in the United States (coal, oil shale, petroleum, natural gas), petroleum represents only about 0.175% of the total on a B. t. u. basis. In 1942 about 7% of the known pertoleum reserves were brought to the surface.

Secondly, because of the nature of the Fischer synthesis reaction the apparatus required has been very cumbersome and very expensive. The synthesis reaction is highly exothermic and the catalysts are very temperature sensitive. If the reaction temperature is allowed to increase even a few degrees, methane instead of the desired higher hydrocarbons, is produced. Accordingly, in order to maintain temperatures within the required narrow limits, Fischer reactors have taken the form of heat exchangers with an enormous amount of heat exchange surface per unit volume of catalytic reaction space. Obviously, such equipment is expensive to fabricate and maintain and cumbersome to operate.

Thirdly, the hydrocarbon product of more than four carbon atoms to the molecule from the Fischer synthesis is of very low quality. Before being suitable for use as a motor fuel it must be subjected to very severe refining procedures with large losses. It is true that the product of gasoline boiling range from the high pressure Fischer synthesis or the synthetic reaction catalyzed by supported promoted iron catalysts is of fair quality but, as has been shown, in these variations of the process one third of the carbon monoxide charged is degraded to carbon dioxide. Additionally, because of the large amount of oxygenated hydrocarbons in the resulting Fischer product, extensive refining is necessary to remove them.

As a result of recent developments, the potentialities of the Fischer process in the United States have become highly attractive and it seems to be beyond argument that immediately postwar the construction of several Fischer units will be begun in this country.

For reasons already briefly considered, as a result of conditions with respect to present petroleum reserves some new means to augment the gasoline supply of the United States must be resorted to sooner or later. Accordingly, increasing attention is being given to the potentialities of the Fischer synthesis in the economy of this country.

The recent perfection of the fluidized catalyst technique in this country has solved most of the problems connected with apparatus for the Fischer synthesis. Instead of placing the catalyst in myriads of tiny tubes surrounded by the cooling medium or immersing myriads of tiny cooling tubes in the catalyst space as was previously necessary to provide adequate heat exchange surface, the catalyst will be in a single large reactor and will be in fluidized form. To control temperature, large amounts of the fluidized catalyst will be removed as a pseudo-fluid from the reactor, will be cooled somewhat and then returned thereto. Or, cooling tubes may be placed in the reactor itself, buried in the fluidized mass of catalyst. Heat exchange is much more efficient with a fluidized catalyst than in a stationary catalyst bed. With a stationary bed, most of the heat must be transferred from particle to particle of the catalyst by conduction through relatively small areas of contact to the heat exchange surface. Under fluidized conditions the rapidly moving catalyst particles collide with each other, thus tending to equalize any temperature differences between particles and also they collide with heat exchanger surfaces, thus mechanically carrying heat to the point of dissipation. Also, the particles that collide with the heat exchange surfaces and become cooled return to the fluidized bed and themselves act as myriads of little heat exchangers with respect to catalyst particles at higher temperatures.

Finally, the development of several new petroleum refining processes makes possible the production of a satisfactory motor fuel from the product of the Fischer synthesis with relatively small loss. The more important of these processes are catalytic aromatization and catalytic cracking, both now familiar to those skilled in the art. In catalytic aromatization, the portions of Fischer product boiling within the usual motor fuel range, preferably after removal of C₅ and, if desired, C₆ hydrocarbons, are passed, preferably in the presence of hydrogen, over a suitable catalyst (e. g. molybdenum or chromium oxides on alumina) at elevated temperatures and at atmospheric to moderate superatmospheric pressure. A large part of the charge is converted into aromatic hydrocarbons to give a product of very high octane number.

In catalytic cracking, the portion of the Fischer product boiling above the usual motor fuel range is passed at elevated temperatures and atmospheric to moderate superatmospheric pressure over a suitable catalyst. A large proportion of the charge is converted into hydrocarbons boiling within the usual motor fuel range which exhibit a high octane number.

This invention is primarily concerned with improvements in the catalytic cracking of those portions of Fischer product boiling above the usual motor fuel range.

Synthetic catalysts for accelerating the cracking of hydrocarbons of higher boiling point to form hydrocarbons of lower boiling point, particularly the conversion of hydrocarbons boiling above the usual motor fuel range to hydrocarbons boiling within the usual motor fuel range, may be divided into two broad classes as follows:

I. Synthetic silica-alumina complexes.
II. Synthetic silica-magnesia complexes.

Catalysts falling in class I exhibit practically constant activity with long continued use. They are moderately sensitive to high temperatures. These class I catalysts are however very sensitive to steam and are rapidly deteriorated thereby. When exposed to temperatures at or below the lower limit for catalytic cracking these materials gradually deteriorate in the presence of steam to a final steady state of lowered activity. At temperatures above the lower limit for catalytic cracking the deterioration in the presence of steam is continuous, zero activity finally being reached. Accordingly, with class I catalysts, the use of steam as a vaporization aid for the charge in the conversion reaction or the presence of steam in the regeneration gases is to be avoided. These catalysts are highly active.

Catalysts falling in class II are usually less expensive than class I catalysts. The activity of class II catalysts remains constant with long continued use. They are less sensitive to high temperatures than class I catalysts. These class II catalysts are unaffected by steam even at temperatures far above the usual catalytic cracking range. They are highly active.

The preparation and use of synthetic silica-magnesia complexes to accelerate the conversion of hydrocarbons boiling above the usual motor fuel range into hydrocarbons boiling within the usual motor fuel range have been described in a number of issued patents and copending applications of the present applicant, for example, U. S. Patents 2,278,590, issued April 7, 1942; 2,323,728, issued July 6, 1943; 2,320,799, issued June 1, 1943 and 2,340,698, issued February 1, 1944, and applications Serial Number 488,905, filed May 28, 1943, now U. S. Patent 2,377,477, issued June 5, 1945, and 398,242, filed June 16, 1941, now abandoned. A large number of synthetic silica-magnesia complexes suitable for use in the conversion of hydrocarbons boiling above the usual motor fuel range into hydrocarbons boiling within the usual motor fuel range have been described in my copending application, Serial Number 401,329, filed July 7, 1941, now U. S. Patent 2,390,556, issued December 11, 1945.

In the above and related patents and copending applications of the present applicant will be found most of the matter given ante with respect to the characteristics of catalysts of the two classes listed. In addition, the excellent product distribution observed when class II catalysts are employed has been pointed out in some of these patents and copending applications. When class II catalysts are employed to catalyze the conversion of hydrocarbons boiling above the usual motor fuel range into hydrocarbons boiling within the usual motor fuel range, for a given percentage conversion of charge to motor fuel, the use of class II catalysts results in the formation of less gas and less carbonaceous residues than when class I catalysts are employed to bring about the same percentage conversion of charge to motor fuel. While this better product distribution observed on using class II catalysts is very advantageous when ordinary charging stocks boiling above the usual motor fuel range are employed, it has been found that when fractions of Fischer product boiling above the usual motor fuel range are employed the use of class II catalysts is absolutely essential for economically feasible results.

When a fraction of Fischer product boiling above the usual motor fuel range (boiling, for example, in the range 410°–650° F.) is catalytically cracked in the presence of a class I catalyst, the results are economically impossible. While with class I catalysts a gasoline of satisfactory octane number (75) can be produced, the gas loss is enormous, the gasoline to gas ration being 0.75, i. e. more gas than gasoline is produced.

Class II catalysts, on the other hand, produce high quality gasoline (75 octane number) also but with comparatively little gas loss (gasoline to gas ratio, 3).

While, naturally, production of carbonaceous residues is small and accordingly relatively unimportant, nevertheless the yields of carbonaceous residues exhibit the same trends, being several times as great when a class I catalyst is used as when a class II catalyst is employed.

The above discussion is based on experimental results obtained at constant gasoline yields.

The above results demonstrate that the use of class II catalysts is essential for the economic conversion of Fischer product boiling above the usual motor fuel range into gasoline. The gasoline produced should be of high octane number (e. g. 70 or above) for efficient utilization in motor fuels and motor fuel blends. Gasoline of 75 octane number can be obtained using both class I and class II catalysts but with the former about four times as much of the charge is converted to gas as with class II catalysts, gasoline production being the same in both cases.

As is well known to those skilled in the art, in the conversion of hydrocarbons obtained from petroleum and boiling above the usual motor fuel range into hydrocarbons boiling within the usual motor fuel range either class I or class II catalysts can be employed. It is a surprising and entirely unexpected result that the conversion of hydrocarbons boiling above the usual motor fuel range and obtained from Fischer product into hydrocarbons boiling within the usual motor fuel range is economically possible only in the presence of class II catalysts.

This invention is specifically concerned with the use of the synthetic silica-magnesia complexes as catalysts to accelerate the conversion of those portions of Fischer product boiling above the usual motor fuel range into hydrocarbons boiling within the usual motor fuel range.

Many synthetic silica-magnesia complexes are suitable for the purposes of this invention and many methods are available for the preparation thereof. Selected illustrative examples of such catalysts and their preparation are presented below in Examples 1 to 19.

One method for the preparation of synthetic silica-magnesia complexes suitable for the purposes of the instant invention involves double decomposition as exemplified by a process wherein a suitable soluble silicate, e. g. sodium silicate, is allowed to react with a soluble magnesium compound, e. g. magnesium sulfate or magnesium chloride. Preferably, a solution of the soluble silicate is added slowly, with agitation, to a solution of the soluble magnesium compound. If the addition is too rapid or if the reaction mixture is not agitated, local spots of high alkalinity develop which result in the production of zeolitic type precipitates from which it is difficult or impossible to remove alkali metal compounds by washing. For the same reason, it is inadvisable to add the solution of the magnesium salt to the soluble silicate solution since by this procedure it is almost impossible to avoid formation of zeolitic type compounds. However, as will be shown in some detail subsequently, the presence of small, controlled amounts of zeolitic type compounds in the finished catalyst is not necessarily disadvantageous. However, if its is desired to produce zeolite containing catalysts it is preferable, in order to maintain absolute control over the amount of zeolitic compounds present, to first produce catalysts free from zeolites and then subsequently treat them in such a manner as to introduce the desired small amount of zeolitic type compounds.

If desired, the silica-magnesia ratios of the complexes formed may be varied over wide limits by the use of alkali metal silicates of varying alkali metal oxide-silica ratios. This is illustrated in Examples 1 to 4 below. A similar result may be accomplished by keeping the alkali metal oxide-silica ratio constant and using a solution of magnesium salt containing more or less acid so that the anion of the magnesium salt plus the anion of the acid is stoichiometrically equivalent or in slight excess over the alkali metal oxide of the soluble silicate.

Example 1

To 25 liters of a solution containing a total of 800 g. of $MgSO_4 \cdot 7H_2O$ there were added over a period of four hours, with stirring, 1.93 liters of a solution containing 376 g. $Na_2SiO_3$. The resulting precipitate was separated from the mother liquor by settling and decanting the latter and was washed by making into a slurry with water, settling and decanting, this washing operation being repeated several times, the washed precipitate finally being separated by filtration. The product contained 38.5% magnesia and 61.5% silica on the water free basis.

Example 2

To 25 liters of a solution containing a total of 800 g. of $MgSO_4 \cdot 7H_2O$ there were added over a period of four hours, with stirring, 2.81 liters of a solution containing 466 g. $Na_2O \cdot 1.5SiO_2$. The resulting precipitate was worked up as described in Example 1. The final product contained 29.5% magnesia and 70.5% silica on the water free basis.

Example 3

To 25 liters of a solution containing a total of 800 g. of $MgSO_4 \cdot 7H_2O$ there were added over a period of four hours, with stirring, 6.18 liters of a solution containing 797 g. $Na_2O \cdot 3.25SiO_2$. The resulting precipitate was worked up as described in Example 1. The final product contained 15.5% magnesia and 84.5% silica on the water free basis.

Example 4

A dilute magnesium sulfate solution was precipitated by the slow addition, with agitation, of a diluted S brand (Philadelphia Quartz Co.) sodium silicate solution. The resulting precipitate was worked up as described in Example 1. The final product contained 14.3% magnesia and 85.7% silica on the water free basis.

In preparations made in accordance with the above examples one can wash initially with slightly acidulated water followed by several washings with pure water. This method of washing however is very apt to give trouble because of the precipitate peptizing. Occasionally, even in the ordinary washing method, peptizing occurs. Whenever the precipitate shows a tendency to peptize it may be coagulated by washing with a dilute solution of a non-reactive electrolyte, preferably one easily removable in subsequent operations such as, for example, ammonium chloride or ammonium nitrate. As will be obvious to those skilled in the art, when washing the precipitate suitable tests are applied to the filtrate from time to time so as to follow the removal of undesired components.

In order to obtain the most active catalysts by the above and similar precipitation methods it is desirable to produce the dried final product in a granular as opposed to a glassy or porcelain-like form. The accomplishment of this desired end is aided in Examples 1–4 by the use of magnesium sulfate instead of magnesium chloride. The divalent sulfate ion has a precipitating power with respect to colloids many times as great as the monovalent chloride ion and accordingly, in the presence of sulfate ion the magnesium silicate formed is immediately coagulated and precipitates as a somewhat granular material in contrast to the gelatinous, slimy precipitate formed in the presence of monovalent chloride ions.

The granular nature of the precipitate is preserved by rapidly bringing it, after washing, to an elevated temperature, for example, 1000° to 1200° F. or even higher, for example, up to 1350° to 1400° F. If the washed precipitate is dried slowly, especially if it is brought to an elevated temperature slowly, the individual particles tend to coalesce and form a glassy or porcelain like product which exhibits an activity inferior to that shown by the granular product. Actually, good activities are obtained if the washed catalysts are slowly brought up to a temperature in the lower portion of the usual catalytic cracking range (e. g. 850° F.) following which the material is rapidly heated to the higher temperatures previously mentioned. However, since equal and frequently somewhat superior results are obtained by rapidly carrying the temperature to the higher limits previously mentioned directly, there is little or no utility in the two step process of heating.

Since it is contemplated that the catalysts described herein will be employed under fluidized conditions no description is included of methods whereby the catalysts may be prepared in the form of particles of appreciable size or of methods whereby finely divided catalysts may be formed into particles, e. g. cylinders, of appreciable size. Such methods are well known to those skilled in the art and many of them have been described in my issued patents and copending applications previously mentioned herein.

A somewhat different scheme of preparation is used in Example 5. Here, the sodium silicate solution is made definitely acid and a magnesium salt solution is added to the resulting rather stable sol. The mixture is then precipitated with an excess of ammonia.

Example 5

One liter of a solution containing 34.3% by weight of $Na_2O \cdot 3.5SiO_2$ was diluted with six volumes of water. The thus diluted water glass solution was vigorously stirred and 600 cc. concentrated (d.=1.19) hydrochloric acid were added rapidly. To the resulting silica sol were added 2000 g. $MgCl_2 \cdot 6H_2O$ in 1500 cc. of water, following which 1000 cc. concentrated ammonia solution (d.=0.88) were added slowly with stirring. After standing over night, the resulting precipitate was separated by filtration and was washed by being made into a slurry with water and filtering, this washing operation being repeated several times. The final product contained 31% magnesia and 69% silica on the water free basis.

By a modification of the process of Example 5 no ammonia is required. In this modification the sodium silicate solution is treated with but little more, say 5% excess, acid than is stoichiometrically equivalent to the sodium oxide of the silicate. A magnesium salt solution is added and the desired complex precipitates, a process that may be accelerated to completion by boiling.

By a slight change in the modification described in the previous paragraph, a somewhat more satisfactory catalyst is obtained. The sodium silicate solution is made but slightly acid as before and then is aged prior to treatment with the solution of the magnesium compound. The time of aging depends upon the exact acidity of the slightly acid sodium silicate solution. If the pH is 6, the acidified sodium silicate solution is aged 30 minutes or more, if the pH is 5, the acidified sodium silicate solution is aged 2.5 hours or more.

Example 6

Catalysts made in accordance with the teachings of my U. S. Patent 2,323,728, issued July 6, 1943, especially Examples 1B, 2B and 3B thereof.

Example 7

Seven hundred and fifty cc. of ethyl orthosilicate are diluted with 437.5 cc. 95% ethanol following which 14 cc. water are added. After standing 24 hours a solution of 81 g. $MgSO_4 \cdot 7H_2O$ dissolved in 127.5 cc. water is added slowly with agitation. The resulting precipitate is washed and dried.

Example 8

One mole of silicon tetrachloride was diluted with an equal volume of absolute alcohol. This solution was added to a solution prepared by dissolving one-half mole of anhydrous magnesium chloride in 200 cc. absolute alcohol. The resulting mixture was treated with an excess of ammonium hydroxide, added slowly with agitation. The resulting precipitate was separated and washed as usual.

Satisfactory catalysts can also be prepared by first forming active silica in the form of the sol, hydrogel or gel and then uniting this with magnesia. Active silica suitable for the purpose may be made by a wide selection of methods and in a wide variety of forms, some of which will be briefly described.

Silica sol, silica hydrogel or silica gel can conveniently be made from alkali metal silicates. Five hundred cc. of sodium silicate solution containing 8.85% sodium oxide and 28.5% silica (N brand, Philadelphia Quartz Co.) are diluted with an equal volume of water. The thus diluted solution and 625 cc. 6N sulfuric acid are simultaneously added, at rates proportional to their respective volumes, to a well agitated reaction vessel. A clear silica sol results. This sets to a hydrogel in 2 to 4 hours, depending upon the temperature. The resulting hydrogel is passed through an acid proof sieve and the hydrogel particles resulting are thoroughly washed. This may be accomplished by covering them with water, allowing to stand say 30 minutes and then removing the water, this washing operation being repeated several times, for example, 6 or 8 times. The washed hydrogel may be dried to give silica gel. If desired, electrolytes may be removed from silica sol by dialysis or more rapidly by electrodialysis to give a fairly stable pure silica sol. If this is done it is preferable to prepare an initial sol having a longer time of set than that specified above. As those in the art are aware, this longer time of set is obtained by using less acid. For example, if only a very little excess acid is used over that required to unite with the sodium oxide of the soluble silicate the time of set is measured in days rather than hours.

A somewhat more satisfactory active silica gel from some points of view can be made by allowing the hydrogel to form at elevated temperatures, for example, 70 to 100° C. Since the time of set of acidified sodium silicate solutions decreases with extreme rapidity with increasing temperatures, again it is desirable to form a hydrogel with a long time of set as described above through the use of less acid than specified, for example, 60 to 75% as much. Catalysts made from high temperature active silica are somewhat more easy to regenerate than those prepared from active silica made at room temperature.

It is advisable to prepare active silica from acidified sodium silicate solutions but this is not absolutely essential. If desired, a sodium silicate solution may be brought almost but not quite to neutrality. The alkaline hydrogel forms with extreme rapidity. This may be washed as previously described, using however slightly acidulated water in the first few washings. By this procedure a rapid time of set is obtained with the expenditure of a minimum amount of total acid. Hereinafter material so prepared will be referred to as large pored silica hydrogel or gel.

Active silica prepared as above may be dried by a variety of methods. For example, the silica sol may be pumped through an atomizer into a heated room or heated gas stream to form silica gel in an extremely fine state of subdivision, the particles then being washed salt free if the sol had not been previously freed of electrolytes. The same type of product may be made by injecting the sol into boiling liquid immiscible with water, for example, kerosene. When these drying methods are employed it advantageous to use a volatile acid, for example, hydrochloric or acetic, in making the sol. Obviously, this does not apply if the sol is freed of electrolytes prior to drying. Hydrogels, preferably after washing, may be dried by adding to a boiling liquid immiscible with water, for example, boiling kerosene. Extremely fine active silica gel particles result.

If desired, washed hydrogel may be spread out on trays and dried in an oven as usual. This produces very fine active silica gel although the particle size is larger than obtained when the processes described immediately above are used.

Active silica can also be made from ethyl orthosilicate. Seven hundred and fifty cc. of ethyl orthosilicate are diluted with 437.5 cc. 95% ethanol followed by the addition of 14 cc. of water. After standing 24 hours 127.5 cc. additional water are added and the resulting reaction mixture is evaporated slowly to give pure silica gel.

A satisfactory active silica can also be made by adding slowly, with agitation, ammonium hydroxide to silicon tetrachloride, preferably diluted with some solvent such as ethanol. The precipitate is washed and dried as usual.

Active silicas (sol, hydrogel, gel) prepared as above or otherwise may be united with magnesia by any one of a variety of methods, some of which will now be briefly described.

Example 9

Two hundred and seventy-five g. of silica gel (from sodium silicate) are added to 2500 cc. water containing 20.4 g. $MgSO_4 \cdot 7H_2O$. The reaction mixture is brought to incipient boiling and is held for two hours with occasional shaking following which the activating solution is decanted and the solid washed 6 times, using a total of 3000 cc. of water. The washed catalyst is then dried. It carries a small amount of adsorbed magnesia.

Example 10

Washed silica hydrogel (from sodium silicate) is covered with a 10M solution of $Mg(NO_3)_2 \cdot 6H_2O$ and the mixture is allowed to stand several hours, preferably over night. Excess solution is removed by draining and the impregnated hydrogel is dried. After drying, the temperature is raised to decompose the nitrate.

Example 11

Six hundred and fifty grams (dry basis) of washed silica hydrogel and 500 g. (dry basis) of freshly precipitated, undried washed magnesium hydroxide are mixed and worked mechanically to form a homogeneous, somewhat thixotropic gel. The magnesium hydroxide may be peptized if desired. The mechanically worked product is dried.

Example 12

To a very slightly acid silica sol (containing 650 g. silica on the dry basis) are added 500 g. (dry basis) of freshly precipitated, undried magnesium hydroxide. The suspension is stirred and brought to a boil, agitation at the boiling point being continued for four hours. The resulting product is removed by filtration, washed and dried. An electrolyte free sol may be substituted for the ordinary sol and the magnesium hydroxide may be peptized if desired.

Example 13

Six hundred and fifty g. of finely divided silica gel are mixed with 300 g. (dry basis) of freshly precipitated, washed but undried magnesium hydroxide. The mixture is mechanically homogenized and dried.

Example 14

Three hundred and fifty g. of dry, active magnesia and 650 g. of finely divided silica gel are mixed together in a ball mill for several hours. The resulting mixture forms the final catalyst.

Example 16

Six hundred and fifty g. (dry basis) of washed silica hydrogel and 210 g. of activated, finely divided magnesium metal are mixed together thoroughly and dried. The magnesium metal is preferably in activated form; activation may be accomplished by forming a superficial bi-metallic couple on the individual metal particles using an element far from magnesium in the E. M. F. series, for example, mercury.

Example 17

This silica-magnesia complex has been described in my copending application, Serial Number 488,905, filed May 28, 1943.

Certain proprietary silica-magnesia complexes are also suitable contact agents for the purposes of the instant invention. Among these may be mentioned:

Example 18

This silica-magnesia complex, commercially known as Magnesol, has been described in my U. S. Patent 2,278,590, issued April 7, 1942.

Example 19

This silica-magnesia complex is prepared by the hydrothermal reaction of e. g. magnesium carbonate with silica, either alone or in the presence of an alkali, e. g. sodium carbonate or the hydrothermal reaction of e. g. magnesium carbonate with sodium silicate as described, for example, in U. S. Patents 1,945,534; 1,999,210; 2,203,614 and 2,173,085. The proprietary silica-magnesia complexes of Examples 18 and 19 are pseudomorphs of calcium silicates and magnesium carbonates respectively.

By suitable variations in preparation methods the activities of the several catalysts described in the previous examples show appreciable changes. For instance, if in those examples calling for the use of silica hydrogel or silica gel, the previously described large pored variety of silica hydrogel or silica gel is used instead, the resulting large pored silica-magnesia catalysts exhibit an even more favorable gasoline to gas ratio than the standard catalysts. The large pored silica-magnesia catalysts are somewhat less active than the standard catalysts but this deficiency can be overcome by increasing the catalytic cracking temperature slightly. It is apparent that when large pored silica-magnesia complexes are substituted for the corresponding standard catalysts, the yields of both gasoline and gas are lower but gas yield declines to a greater extent than gasoline yield resulting in a more favorable gasoline to gas ratio when the large pored silica-magnesia catalysts are used.

A similar effect is observed when the standard silica-magnesia complexes are united with a very small amount of sodium oxide to form, presumably, traces of zeolitic materials. The silica-magnesia complex Magnesol of Example 18 is commercially produced in a variety known as Magnesol CC which contains appreciable sodium oxide. The preparation of this variety is described in U. S. Patent 2,353,970, wherein the treatment of Magnesol with a dilute sodium silicate solution is shown. While the commercial product Magnesol CC contains such a large amount of sodium oxide as to be practically devoid of catalytic activity, by modifying the method of preparation through use of considerably less sodium silicate highly interesting catalysts may be prepared, not only from Magnesol but also from the other silica-magnesia catalysts previously described. The resulting materials should contain not more than 2.5% sodium oxide and preferably much less, for example 1% or less. On increasing the amount of sodium oxide incorporated in the silica-magnesia complexes but keeping within the limit above specified gasoline yield slowly declines. However, there is good evidence that with some catalysts the addition of a very small amount of sodium oxide, for example, 0.5% or less, actually has a slightly activating effect, gasoline yield increasing somewhat. On increasing the amount of sodium oxide incorporated in the silica-magnesia complexes but keeping within the limit above specified gas yield declines much more rapidly than gasoline yield resulting in a more favorable gasoline to gas ratio.

While the introduction of sodium oxide by means of sodium silicate has been described and is very convenient, other suitable sodium salts or sodium hydroxide may be used for the purpose.

If desired, the silica-magnesia contact agents of the instant invention may be activated or treated with activators prior to use. The catalysts may be improved to a greater or less degree by giving them a light treatment at elevated temperatures with a dilute acid such as sulfuric acid or hydrochloric acid. Or, a small amount, for example, 5% by weight, of hydrofluoric acid may be added to the catalyst and the resulting mixture gently calcined. These treatments seem to loosen the structure by removing a little magnesia and silica respectively. If desired, both treatments may be applied to a single catalyst. Obviously, it is best to apply these treatments prior to adding sodium oxide to the catalyst if such an addition is contemplated.

Certain beneficial results follow the addition of selected activators in relatively small amounts to the catalysts of the instant invention. These activators may be added during the preparation of the catalysts or the finished catalysts may be impregnated with thermally decomposable salts of the activators following which the impregnated catalysts are calcined. Among activators found to be more or less beneficial may be mentioned boric oxide, beryllia, thoria, zirconia and alumina. About 5% or less of these activators, based on the weight of the catalyst, may be used.

As might be expected, not all of the catalysts of the previous examples are of equal activity. However, consideration will show that the highest possible activity is not always desirable. For example, in catalytic cracking it is preferable to operate in the vapor phase and when the charging stock is very high boiling, high temperatures are required to secure complete vaporization. At such high temperatures and in the presence of the most active catalysts over cracking and secondary reactions frequently occur which result in lowered yields of the desired product. Under such circumstances the use of less active catalysts is advantageous. The activities of the catalysts of the previous examples may be approximately classified as follows:

Highly active: Examples 1, 2, 3, 4, 6, 11, 12, 18, 19.

Moderately active: Examples 5, 7, 8, 10, 13, 14, 15, 16, 17.

Active: Example 9.

Having now described a representative group of synthetic silica-magnesia catalysts suitable for the purposes of the instant invention, the utilization of such catalysts in the process of the instant invention will now be described.

*Example 20*

A fraction of Fischer product having a boiling range of 410° to 650° F. was catalytically cracked at 850° F. in the presence of a silica-magnesia catalyst under fluidized catalyst conditions. The rate of flow was so adjusted that the conversion of charge to gasoline was 30% by volume. This gasoline had an octane number of 75. The gas yield was 10% by weight. The average residence time of a catalyst particle in the reactor was sixty minutes.

*Example 21*

The charge employed in Example 20 was similarly cracked in the presence of a synthetic silica-alumina catalyst. On adjusting the rate of flow of charge so as to result in a 30% by volume conversion to gasoline it was found that 40% by weight of the charge was converted to gas.

Due to their insensitivity to steam, the catalysts of the instant invention are especially useful in the conversion of suitable fractions of Fischer product obtained when using supported promoted iron catalysts, preferably at intermediate pressures, or when using promoted, fused, reduced metal oxide catalysts at elevated pressures. As has been mentioned previously, when using such catalysts the resulting Fischer product contains appreciable oxygenated hydrocarbons. When the portions of such Fischer products boiling above the usual motor fuel range are catalytically cracked the oxygenated hydrocarbons therein are decomposed with the elimination of water (steam). As has been mentioned, while synthetic silica-alumina catalysts are deteriorated in the presence of steam, synthetic silica-magnesia catalysts are unaffected.

As will be understood by those skilled in the art the synthetic silica-magnesia catalysts during use in the process of this invention sooner or later decline in activity due to the deposition of carbonaceous residues thereon. Such deactivated catalysts may be restored to original activity by burning the carbonaceous residues therefrom by methods and means familiar to those skilled in the art.

Be it remembered that while the present invention has been described by means of certain specific examples thereof it is to be understood that this invention is to be in no way limited by these specific examples except in so far as the limitations thereof may appear in the following claims.

I claim:

1. In the conversion of Fischer product at least substantially boiling above the usual motor fuel range and contaminated with oxygen containing compounds into hydrocarbons boiling within the usual motor fuel range the step including contacting said charge at an elevated temperature for a time sufficient to effect the desired conversion with a catalyst comprising a synthetic magnesium silicate containing from a trace up to about 1% zeolitic sodium oxide.

2. In the conversion of Fischer product at least substantially boiling above the usual motor fuel range and contaminated with oxygen containing organic compounds into hydrocarbons boiling within the usual motor fuel range the steps including vaporizing said charge and contacting the resulting vapors at an elevated temperature for a time sufficient to effect the desired conversion with a catalyst comprising a synthetic magnesium silicate containing from a trace up to 1% zeolitic sodium oxide.

3. In the conversion of Fischer product at least substantially boiling above the usual motor fuel range and contaminated with oxygen containing organic compounds the step including contacting said charge at an elevated temperature for a time sufficient to effect the desired conversion with a catalyst comprising a synthetic magnesium silicate pseudomorph of calcium silicates, said catalyst containing from a trace up to 1% zeolitic sodium oxide.

4. In the conversion of Fischer product at least substantially boiling above the usual motor fuel range and contaminated with oxygen containing compounds into hydrocarbons boiling within the usual motor fuel range the steps including vaporizing said charge and contacting the resulting vapors at an elevated temperature for a time sufficient to effect the desired conversion with a catalyst comprising a synthetic magnesium silicate pseudomorph of calcium silicates, said catalyst containing from a trace up to 1% zeolitic sodium oxide.

5. In the conversion of Fischer product at least substantially boiling above the usual motor fuel range and contaminated with oxygen containing organic compounds into hydrocarbons boiling within the usual motor fuel range the step including contacting said charge at an elevated temperature for a time sufficient to effect the desired conversion with a catalyst comprising a synthetic magnesium silicate prepared by the interaction of a solution of a soluble silicate and a solution of a soluble magnesium salt, said catalyst containing from a trace up to 1% zeolitic sodium oxide.

6. In the conversion of Fischer product at least substantially boiling above the usual motor fuel range and contaminated with oxygen containing organic compounds into hydrocarbons boiling within the usual motor fuel range the steps including vaporizing said charge and contacting the resulting vapors at an elevated temperature for a time sufficient to effect the desired conversion with a catalyst comprising a synthetic magnesium silicate prepared by the interaction of a solution of a soluble silicate and a solution of a soluble magnesium salt, said catalyst containing from a trace up to 1% of zeolitic sodium oxide.

7. In the conversion of Fischer product at least substantially boiling above the usual motor fuel range and contaminated with oxygen containing organic compounds into hydrocarbons boiling within the usual motor fuel range the step including contacting said charge at an elevated temperature for a time sufficient to effect the desired conversion with a catalyst comprising a synthetic magnesium silicate prepared by the union of magnesia with a material selected from the class consisting of silica gel, silica hydrogel and silica sol, said catalyst containing from a trace up to 1% zeolitic sodium oxide.

8. In the conversion of Fischer product at least substantially boiling above the usual motor fuel range and contaminated with oxygen containing organic compounds into hydrocarbons boiling within the usual motor fuel range the steps including vaporizing said charge and contacting the resulting vapors at an elevated temperature for a time sufficient to effect the desired conversion with a catalyst prepared by the union of magnesia with a material selected from the class consisting of silica sol, silica hydrogel and silica gel, said catalyst containing from a trace up to 1% zeolitic sodium oxide.

ROBERT F. RUTHRUFF.

REFERENCES CITED

The following references are of record in the file of this patent:

UNITED STATES PATENTS

| Number | Name | Date |
|---|---|---|
| 2,229,353 | Thomas | Jan. 21, 1941 |
| 2,278,590 | Ruthruff | Apr. 7, 1942 |
| 2,288,875 | D'Ouville | July 7, 1942 |
| 2,319,836 | Woerner | May 25, 1943 |
| 2,320,799 | Ruthruff | June 1, 1943 |
| 2,323,728 | Ruthruff | July 6, 1943 |
| 2,331,338 | Michael et al | Oct. 12, 1943 |
| 2,340,698 | Ruthruff | Feb. 1, 1944 |
| 2,360,787 | Murphree et al. | Oct. 17, 1944 |
| 2,361,978 | Swearingen | Nov. 7, 1944 |
| 2,367,694 | Snuggs | Jan. 23, 1945 |
| 2,377,512 | Page | June 5, 1945 |
| 2,377,657 | Watts | June 5, 1945 |
| 2,377,935 | Gunness | June 12, 1945 |
| 2,379,027 | Monro | June 26, 1945 |